(12) United States Patent
Jaiswal et al.

(10) Patent No.: US 11,195,122 B2
(45) Date of Patent: Dec. 7, 2021

(54) INTELLIGENT USER NOTIFICATION DURING AN EVENT IN AN INTERNET OF THINGS (IOT) COMPUTING ENVIRONMENT

(71) Applicant: INTERNATIONAL BUSINESS MACHINES CORPORATION, Armonk, NY (US)

(72) Inventors: Peeyush Jaiswal, Boca Raton, FL (US); Priyansh Jaiswal, Boca Raton, FL (US); Shikhar Kwatra, Morrisville, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 334 days.

(21) Appl. No.: 15/964,563

(22) Filed: Apr. 27, 2018

(65) Prior Publication Data
US 2019/0334733 A1 Oct. 31, 2019

(51) Int. Cl.
G06F 15/16 (2006.01)
G06N 20/00 (2019.01)
H04L 29/08 (2006.01)
H04W 4/029 (2018.01)

(52) U.S. Cl.
CPC ............ *G06N 20/00* (2019.01); *H04L 67/24* (2013.01); *H04L 67/26* (2013.01); *H04W 4/029* (2018.02)

(58) Field of Classification Search
CPC ...... H04L 12/1822; H04L 51/24; H04L 67/24; H04L 67/26; H04L 12/1895; H04L 51/20; H04L 67/22; H04W 4/029; G06N 20/00
See application file for complete search history.

(56) References Cited

U.S. PATENT DOCUMENTS

| | | | |
|---|---|---|---|
| 2007/0086365 A1* | 4/2007 | Chen | H04M 3/56 370/260 |
| 2007/0100986 A1* | 5/2007 | Bagley | G06Q 10/10 709/224 |
| 2007/0263805 A1* | 11/2007 | McDonald | H04L 12/66 379/93.26 |
| 2009/0154671 A1* | 6/2009 | Weiss | H04L 63/08 379/93.02 |
| 2010/0037151 A1* | 2/2010 | Ackerman | H04L 65/4015 715/753 |
| 2010/0312897 A1* | 12/2010 | Allen | H04L 12/1818 709/227 |
| 2011/0040836 A1* | 2/2011 | Allen | H04L 65/1093 709/205 |

(Continued)

*Primary Examiner* — Dustin Nguyen
*Assistant Examiner* — Hao H Nguyen
(74) *Attorney, Agent, or Firm* — Griffiths & Seaton PLLC

(57) ABSTRACT

Embodiments for intelligent notification during an event in an Internet of Things (IoT) computing environment by a processor. During a scheduled event, user activity for one or more users and geolocation of the one or more active UEs linked to the event may be monitored using a machine learning operation. A notification may be provided to one or more UEs associated with the user to alert the user to respond to the query upon determining the user failed to respond to the query during the event. The notification may be terminated or disabled upon learning the user or an alternative user responded to the query.

20 Claims, 6 Drawing Sheets

(56) References Cited

U.S. PATENT DOCUMENTS

| | | | |
|---|---|---|---|
| 2011/0060591 A1* | 3/2011 | Chanvez | H04M 3/42221 704/270 |
| 2012/0128322 A1* | 5/2012 | Shaffer | G11B 20/10527 386/241 |
| 2013/0339436 A1* | 12/2013 | Gray | H04L 51/24 709/204 |
| 2014/0362165 A1* | 12/2014 | Ackerman | H04L 65/4076 348/14.07 |
| 2016/0050175 A1 | 2/2016 | Chaudhry et al. | |
| 2016/0316343 A1* | 10/2016 | Kan | H04W 4/022 |
| 2017/0185575 A1* | 6/2017 | Sood | G06F 16/4393 |
| 2017/0302609 A1* | 10/2017 | Vardhan | H04L 67/306 |
| 2019/0005955 A1* | 1/2019 | Bhattacharya | H04M 3/563 |
| 2019/0173926 A1* | 6/2019 | Lal | H04L 65/403 |
| 2019/0297484 A1* | 9/2019 | Dames | H04L 67/26 |
| 2020/0084510 A1* | 3/2020 | Cunico | G06N 20/00 |

\* cited by examiner

US 11,195,122 B2

INTELLIGENT USER NOTIFICATION DURING AN EVENT IN AN INTERNET OF THINGS (IOT) COMPUTING ENVIRONMENT

BACKGROUND OF THE INVENTION

Field of the Invention

The present invention relates in general to computing systems, and more particularly, to various embodiments for intelligent user notification during an event in an Internet of Things (IoT) computing environment using a computing processor.

Description of the Related Art

Computing systems may be found in the workplace, at home, or at school. In today's society, consumers, businesspersons, educators, and others communicate over a wide variety of mediums in real time, across great distances, and many times without boundaries or borders. The advent of computers and networking technologies has made possible the intercommunication of people from one side of the world to the other. These computing systems allow for the sharing of information between users in an increasingly user friendly and simple manner. The increasing complexity of society, coupled with the evolution of technology, continue to engender the sharing of a vast amount of information between people.

SUMMARY OF THE INVENTION

Various embodiments for intelligent notification during an event in an Internet of Things (IoT) computing environment by a processor are provided. In one embodiment, by way of example only, a method for intelligent notification during a conference call in an Internet of Things (IoT) computing environment, again by a processor, is provided. During a scheduled event, user activity for one or more users and geolocation of the one or more active UEs linked to the event may be monitored using a machine learning operation. A notification may be provided to one or more UEs associated with the user to alert the user to respond to the query upon determining the user failed to respond to the query during the event. The notification may be terminated or disabled upon learning the user or an alternative user responded to the query.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
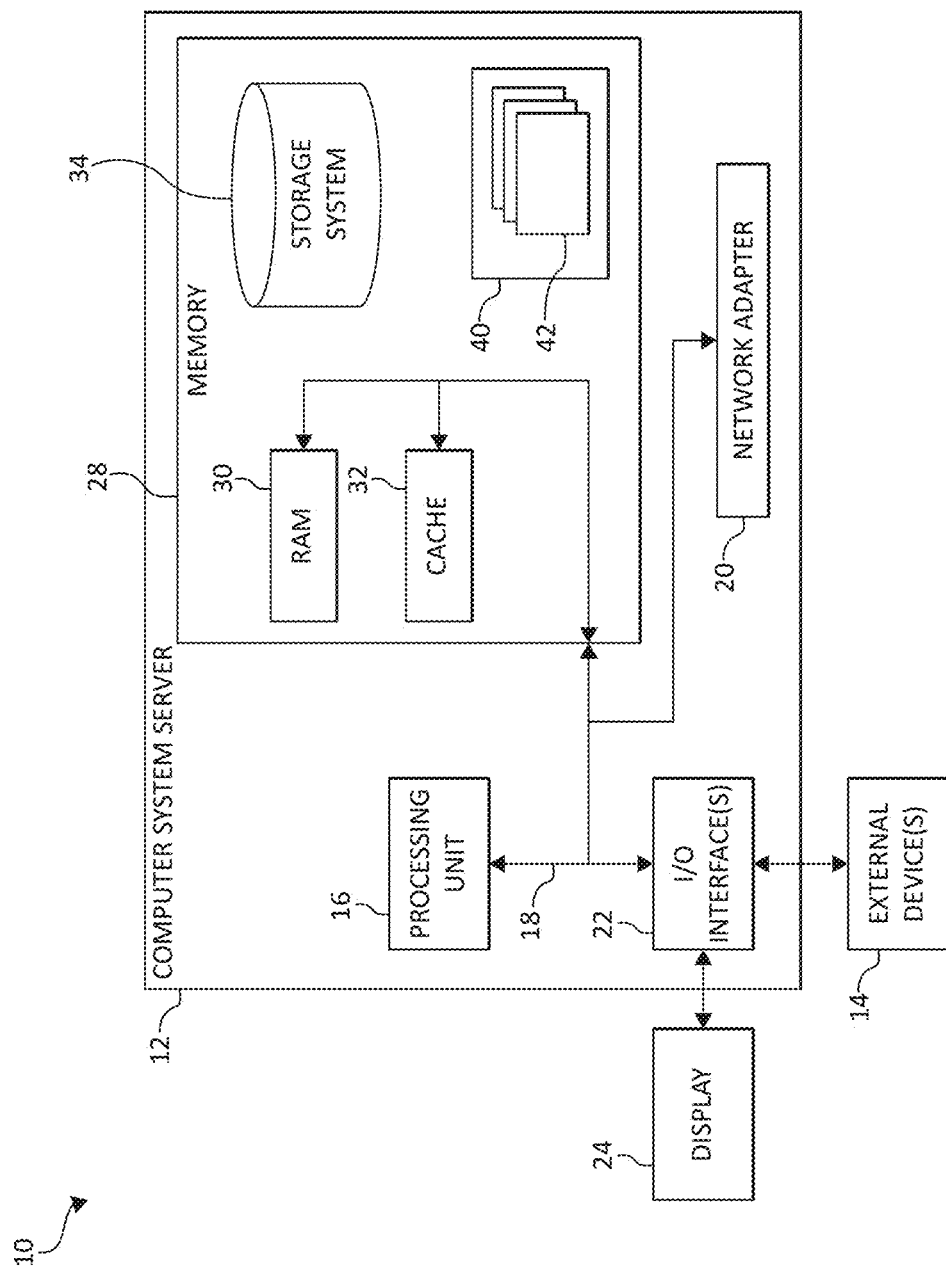
FIG. 1 is a block diagram depicting an exemplary cloud computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, with the advent of immediate, real-time communication enables various user equipment ("UE") such as, for example, a computing device/wireless communication device (e.g., the IoT device) to share communications, such as conference calls (e.g., audio and/or video conference calls), messages, chat messages, emails, speeches, social media posts, and other content to a variety of other users. More specifically, multiple users may engage in a conference call using various computing devices (e.g., a UE). During the call, a person may be addressed or spoken to during the conference call. However, this person may have muted the phone or have left his phone unattended temporarily, for instance, so as to secure a refreshment or attend to some other distraction believing that the general conversation is still occurring on the call that does not require the person's attention. However, when the person is addressed or asked a question by name, the person currently has no means of knowing his attendance is required and that can lead to loss of information from one side to another, losing some reputation, and/or even good will making an impression that the person who was on the call during the start is not responding as that person may have stopped listening or attending the call.

Accordingly, the present invention provides for intelligent notification during an event in an Internet of Things (IoT) computing environment. The mechanisms of the illustrated embodiments provide that during a scheduled event, user activity for one or more users and geolocation of the one or more active UEs linked to the event may be monitored using a machine learning operation. A notification is provided to one or more user equipment (UE) associated with a user to alert the user to respond to the query upon determining the user failed to respond to a query during the event. The notification may be terminated or disabled upon learning the user or an alternative user responded to the query.

In an additional aspect, communication of a user's linked devices may be monitored and the user may be notified based on learning the respective user is being addressed on the conference call. A user's position may be detected and a nearest device closest to the user (e.g., closest in physical or virtual proximity to the user) may be notified so that the user can respond accordingly or keep listening to the conversation intently via any of the linked devices. A timer-based notification operation may be activated and used after the user's name has been addressed and the user has not responded within that time frame for better efficiency.

Said differently, the activity of the user during a conference call (along with the conference call itself) may be monitored on all the active devices (e.g., one or more UEs) while the user is on the conference call. The active devices may be those computing devices associated with the user that may be linked together. In one aspect, the active device may be the computing device that provides access for the user to join and/or engage in the conference call. Based on monitoring the user's activity on the active, linked devices, a user name, which has been called, and/or a query issued/directed to the user during the conference call may be detected using one or more machine learning operations such as, for example, by using natural language processing keyword extraction while monitoring the conference call. Using a timer, a determination may be performed to determine the user failed to respond to the user's name being stated and/or the query during a predetermined time period. Once the predetermined time period has expired (e.g., 2-5 seconds), a notification may be triggered to one or more of the user's linked devices, which may be a nearest active, linked device (e.g., closest in physical and/or virtual proximity). A geolocation and activity of the user may be monitored with respect to the respective, linked devices for determining which of the active, linked devices are to receive the notification. In one aspect, the notification may include the query, comment, or question asked from the user (as recorded with a timestamp). Also, a determination may be determined and/or computed if the user has seen the notification from one of the active devices. Once seen and/or responded, the notification may be terminated on all the linked devices.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
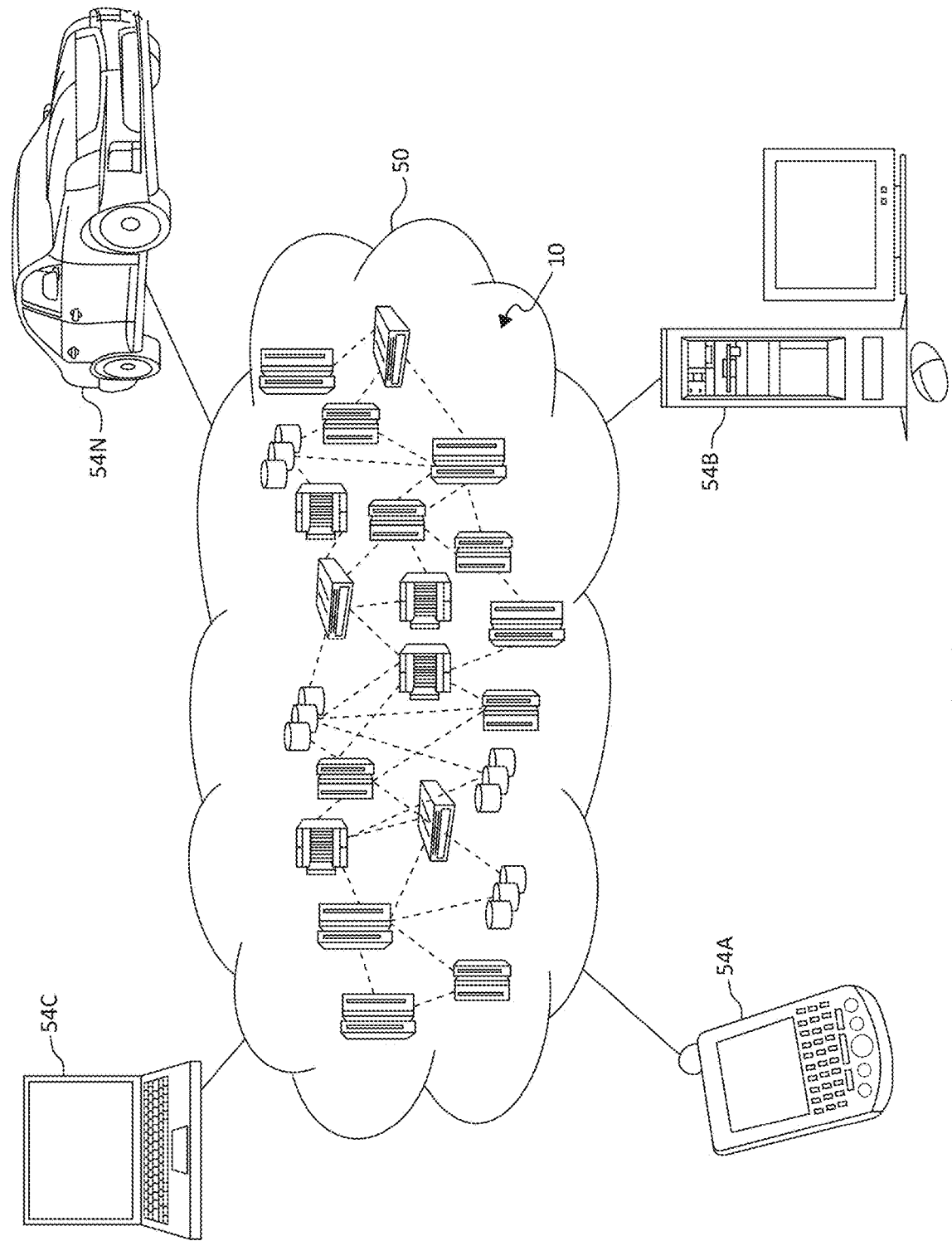
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
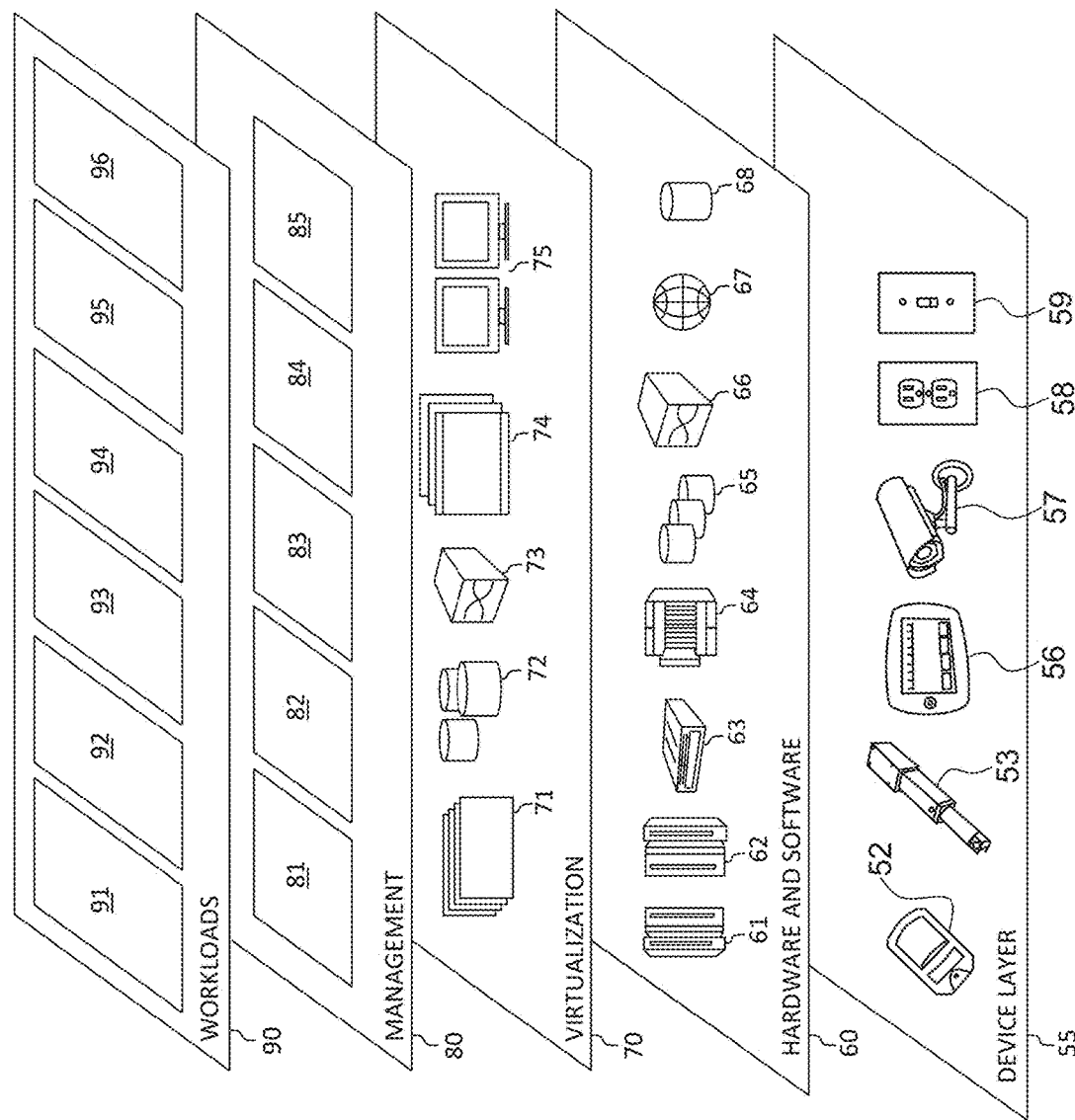
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent user notification during an event. In addition, workloads and functions 96 for intelligent user notification during an event may include such operations as data analysis, data authentication and identification, device identity/attribute analysis, user identity/attribute analysis, and as will be further described, user and device management functions. One of ordinary skill in the art will appreciate that the workloads and functions 96 for intelligent user notification during an event may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
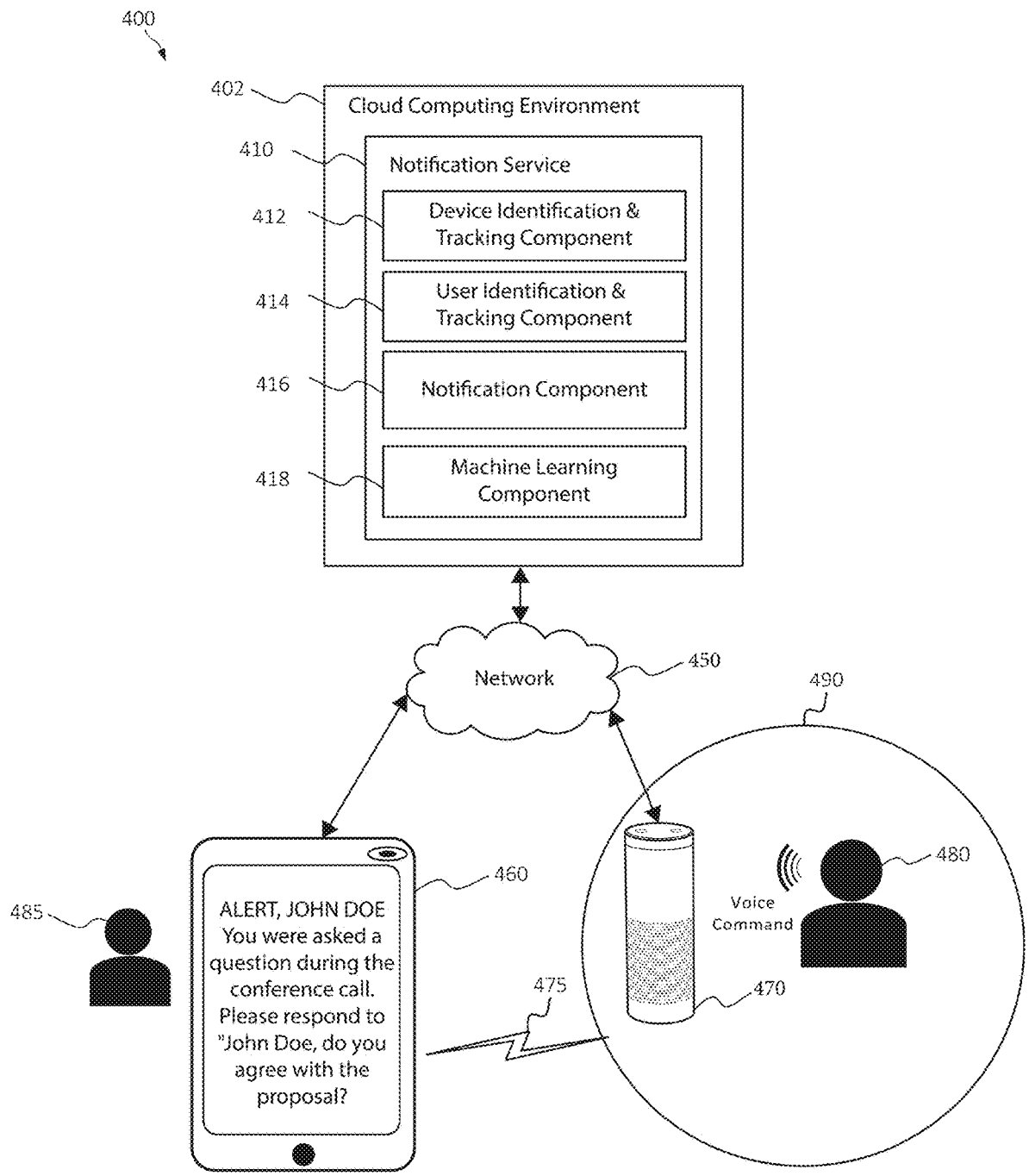
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates a system 400 for intelligent user notification during an event in an IoT computing environment, such as a computing environment 402 (e.g., a cloud computing environment), according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere.

The system 400 may include the cloud computing environment 402, a notification service 410, one or more IoT devices 470 (e.g., a digital assistant), and one or more devices such as, for example, device 460 (e.g., a desktop computer, laptop computer, tablet, smartphone, and/or another electronic device that may have one or more processors and memory). The device 460, the IoT devices 470, the notification service 410, and the computing environment 402 may each be associated with and/or in communication with each other, by one or more communication methods, such as a computing network 450. In one example, the device 460, the IoT devices 470, the notification service 410, and the computing environment 402 may be controlled by an owner, customer, or technician/administrator associated with the computing environment 402. In another example, the device 460, the IoT devices 470, the notification service 410, and the computing environment 402 may be completely independent from the owner, customer, or user of the computing environment 402.

In one aspect, the computing environment 402 may provide virtualized computing services (i.e., virtualized computing, virtualized storage, virtualized networking, etc.) to device 460 and/or the IoT devices 470. More specifically, the computing environment 402 may provide virtualized computing, virtualized storage, virtualized networking and other virtualized services that are executing on a hardware substrate. In one aspect, the one or more IoT devices 470 may communicate with the device 460 using network 450. Also, the one or more IoT devices 470 may communicate with the device 460 using one or more communication connections such as, for example, a Wi-Fi Internet connection 475.

As depicted in FIG. 4, the computing environment 402 may include the notification service 410. The notification service 410 may also function as a database and/or service that may store, maintain, and update data, services, and/or resources internal to and/or external to the cloud computing environment 402. The notification service 410 may store, maintain, and update device identification and authorization information and/or biometric identification (ID) data associated with the device and one or more user profiles, such as, for example, voice data, fingerprint data, and/or retinal data.

In one aspect, the notification service 410 may assist in providing access to and/or assist in performing one or more various types of data, services and/or resources. In one aspect, the data, services and/or resources may include, for example, but are not limited to, data content associated with a user, a device or a command, such as, for example, identifying a speaker during a conference call via audio or visual means. The notification service 410 may provide a device identification and tracking component 412, a user identification (ID) and tracking component 414, a notification component 416, and a machine learning component 418.

In one aspect, the one or more IoT devices 470 may communicate with the device 460 using one or more communication connections such as, for example, a Wi-Fi Internet connection 475 or other wireless communication connections. The device 460 and the IoT devices 470 may communicate with the cloud computing environment 402 via the network 450 to send a unique device identification (ID) sent from the device 460 and/or an IoT identification (ID) that was received from the IoT device 470. That is, the device 460 and/or the IoT devices 470 may log into the cloud computing environment 402, for the user 480 and/or user 485, using various login credentials, which can include a user identification (ID), a unique device ID of the device 460 and/or the IoT device ID received from the IoT device 470. The unique device ID of the device 460 and/or the IoT device ID received from the IoT device 470 may be stored, maintained, and/or received in a device identification and tracking component 412 of the notification service 410. The user ID may be stored, maintained, and/or received in a user identification and tracking component 414 of the notification service 410.

That is, the user 480 and/or 485 can provide voice commands to the IoT device 470 and/or device 460 to provide other biometric data, which may be stored and/or retrieved at later times as the biometric ID data for authenticating the IoT device 470 and/or device 460 and also the users 480 or 485.

The device identification and tracking component 412 may define, establish, and track a physical presence of the one or more users within a defined proximity with the device 460 and/or IoT device 470. The device identification and tracking component 412 may define, establish, and track a virtual presence of the one or more users 480 associated with the device 460 and/or IoT device 470.

The user ID and tracking component 414 may establish a physical or virtual awareness of user 480. Moreover, the user ID and tracking component 414 may also identify and authorize the user 480 for accessing, using, or executing a command in the cloud computing environment 402 for accessing data/content, services and/or resources. For example, the user 480 may communicate voice commands to the IoT device 470. The cloud computing environment, in association with the IoT device 470 may identify the user 480 as the speaker (e.g., "speaker identification") or voice of the issued command. For example, using the embodiments described herein, the cloud computing environment 402 and/or the user ID and tracking component 414 can identify the user 480 speaking when one or more persons connect from each customer's own device (laptop, tablet, phone) such as, for example, device 460 and/or via the IoT device 470. By establishing the authenticated identity, which may include the identification for each user, such as user 480, the cloud computing environment 402, the user ID and tracking component 414, and/or the device 460/IoT device 470 (each having the authorized identity) can identify which user issued a voice command, such as to the IoT device.

In one aspect, the notification component 416 may monitor, during a scheduled event such as, for example, a conference call, user activity for one or more users such as, for example, users 480 and 485. The conference call, for example, may include multiples users at one or more physical or virtual locations that may use IoT device 470. Also, in conjunction with the device identification and tracking component 412 and/or the user ID and tracking component 414, the notification component 416 may monitor geolocation of the one or more active UEs linked to the event (e.g., conference call) such as, for example, device 460 and/or IoT device 470. More specifically, using the machine learning component 418, the identity, behavior, activity, and/or presence or absence of a user (e.g., user 480 and/or 485) may be learned.

The machine learning component 418 may extract one or more features for identifying the user providing a communication during the event such as, for example, user 480 issuing a query to user 485, which may state "John Doe, do you agree with the proposal?" Using natural language processing (NLP) or an alternative AI operation, the one or more communications (e.g., the audio inquiry) of the event may be processed. That is, the machine learning component 418 may employ one or more cognitive applications (e.g., NPL, artificial intelligence (AI), machine learning, IBM® Watson® Alchemy Language (IBM Watson and Alchemy are trademarks of International Business Machines Corporation)) and one or more data resources (e.g., big data resources such as data from a HDFS, GPS Satellite imaging data, cloud computing data, etc.)

In one aspect, the notification component 416, in association with the machine learning component 418, may also convert image or video data of the one or more communications to text data. The machine learning component 418 may also convert audio data of the one or more communications to text data (e.g., converting the voice-command query "John Doe, do you agree with the proposal" to text data).

In one aspect, in association with monitoring the user activity of user 480 and/or user 485, the notification component 416 may determine user 485 may have failed to respond (e.g., via one or more means such as, for example, an audible response, a visual response, and/or text-based response) to the query issued by user 480 to IoT device 470, which may be hosting the conference call.

For example, in one aspect, the monitoring operations may include using a timer that timestamps each communication by each user. Upon issuing a command (or by stating the name or identity of user 485 such as "John Doe") by user 480 directed to user 485, a timing operation may commence to provide user 485 a predetermined amount of time (e.g., 5 second wait time) for responding to the query. Upon expiration of the predetermined amount of time, the notification component 416 may determine user 485 failed to respond and may also determine a physical or virtual presence and/or a physical or virtual absence of the user 485. For example, the notification component 416 may determine user 485 is physically absent from the conference call. More specifically, the notification component 416 may determine a geolocation of the user and determine that the user 485 is outside a defined physical radius 490 for the conference call according to the geolocation of the user 485. The notification component 416 may also detect that device 460 is active and linked to the user 485.

The notification component 416 may determine that the device 460 is a computing device that is active and linked to the user which may also be a closest device in physical proximity to the user (e.g., a smartphone or wearable IoT device located on the person of user 485).

Thus, the notification component 416 may provide and/or send a notification to one or more UEs such as, for example, device 460 and/or IoT device 470, which may be associated with the user (e.g., user 485) to alert the user 485 to respond to the query (issued by user 480) upon determining the user 485 failed to respond to the query during the event. In one aspect, each of the active and linked devices associated with the user may receive the notification. In an alternative embodiment, each of the active and linked devices associated with the user may be prioritized according to one or more parameters, policies, rules, and/or preferences for receiving the notification. For example, in one aspect, the notification may be provided to a nearest device. If the nearest device becomes unavailable or non-responsive, a next closest in physical proximity may be alerted with the notification.

In the event the user 485 responds to the query issued in the notification via the notification service (either directly to IoT device 470 or device 460), the notification to device 460 may be terminated upon learning the user or an alternative user responded to the query.

In one aspect, the machine learning component 418 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
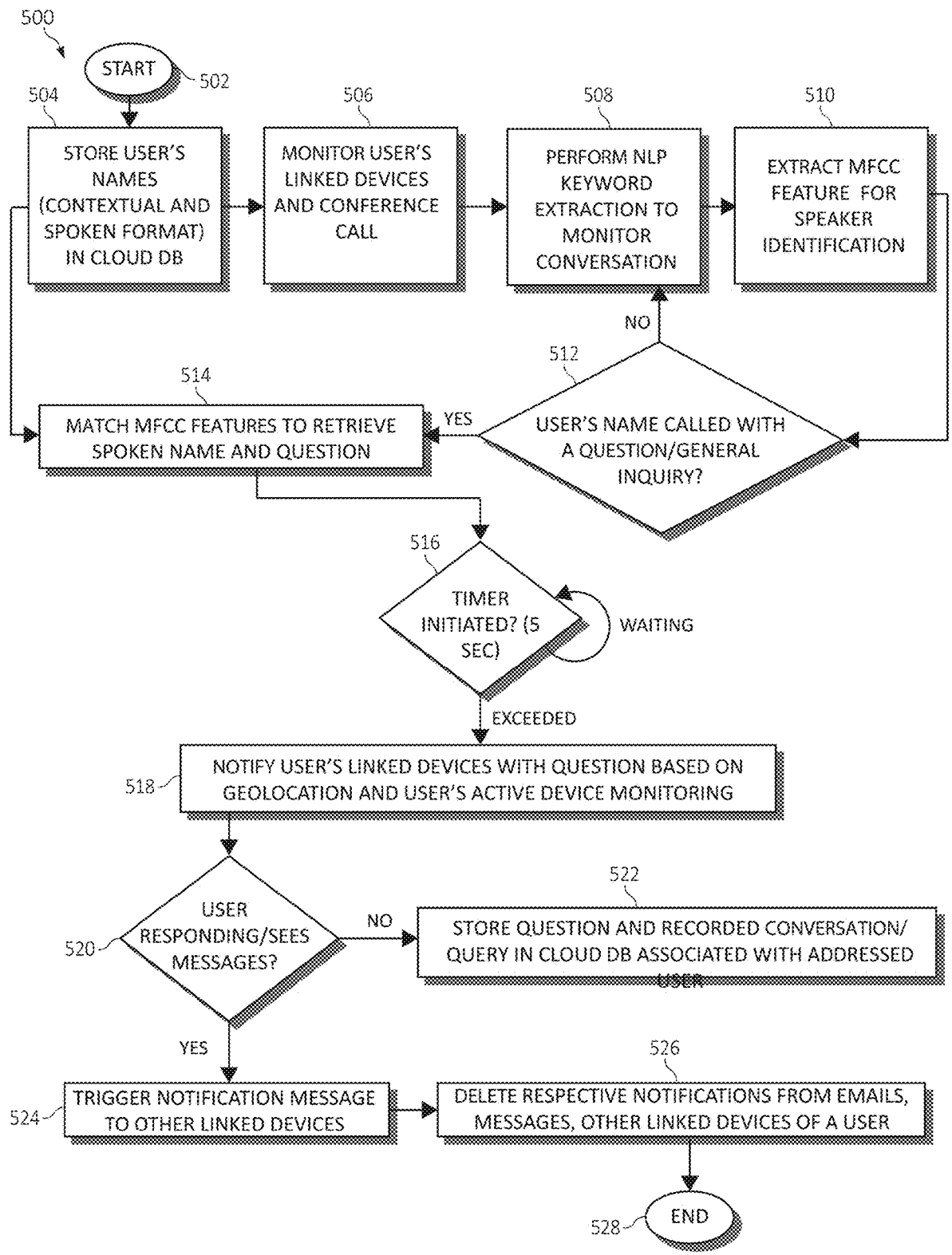
FIG. 5 is a flowchart diagram depicting an additional exemplary method for intelligent user notification during an event in a computing environment by a processor, again in which aspects of the present invention may be realized.

Turning now to FIG. 5, a method 500 for intelligent notification during an event (e.g., conference call) in an Internet of Things (IoT) computing environment is depicted, in which various aspects of the illustrated embodiments may be implemented. The functionality 500 may be implemented as a method executed as instructions on a machine, where the instructions are included on at least one computer readable medium or on a non-transitory machine-readable storage medium. The functionality 500 may start in block 502.

One or more users' names (e.g., contextual and spoken format) may be stored in a database (e.g., stored with a spelling of the name of respective voices), as in block 504. In one aspect, a combination of NLP keyword extraction and feature extraction (e.g., Mel Frequency Cepstral Coefficients "MFCC") may be used for learning or identifying the user. Each linked device associated with the user and a conference call may be monitored, as in block 506. A NLP keyword extraction operation may be performed (and/or used) to monitor one or more communications (e.g., a conversation) occurring during the event, as in block 508. Moving to block 510, one or more features (e.g., MFCC feature extraction) may be extracted from the communications for speaker identification (e.g., identifying which user is speaking). A determination operation may be performed to determine if a user's name has been mentioned or called in one or more communications and/or a query is provided for the user, as in block 512. That is, the determination may determine whether or not the user's name has been called with a question and/or general inquiry. If no, the functionality 500 may return to block 508. If yes, the method may be moved to block 514.

At block 514, one or more features may be matched (e.g., MFCC feature matching) from the one or more communications to identify and/or retrieve both the spoken name and/or the associated query. A determination operation may be performed to determine if a predetermined time period has initiated and/or expired (e.g., 5 second wait time), as in block 516. If no (e.g., "waiting"), the functionality 500 may repeat block 516. If the functionality 500 has initiated, exceeded and/or expired the predetermined time period, one or more linked UEs (associated with a user) may be notified with the query based on geolocation and/or the user's active devices may be monitored, as in block 518.

A determination operation may be performed to determine if the user has responded and/or is aware of the query, as in block 520. If no, the query and/or conversation may be stored and recorded (with a timestamp) and the query may be stored in a cloud computing database associated with the addressed user, as in block 522. If yes at block 520, a notification message may be triggered from one of the linked, active devices (e.g., seen devices to other linked devices), as in block 524. One or more respective notifications may be deleted from one of a plurality of communication means such as, for example, emails, messages, communications, and/or other linked devices of the user, as in block 526. The functionality 500 may end in block 528.

Figure 6:
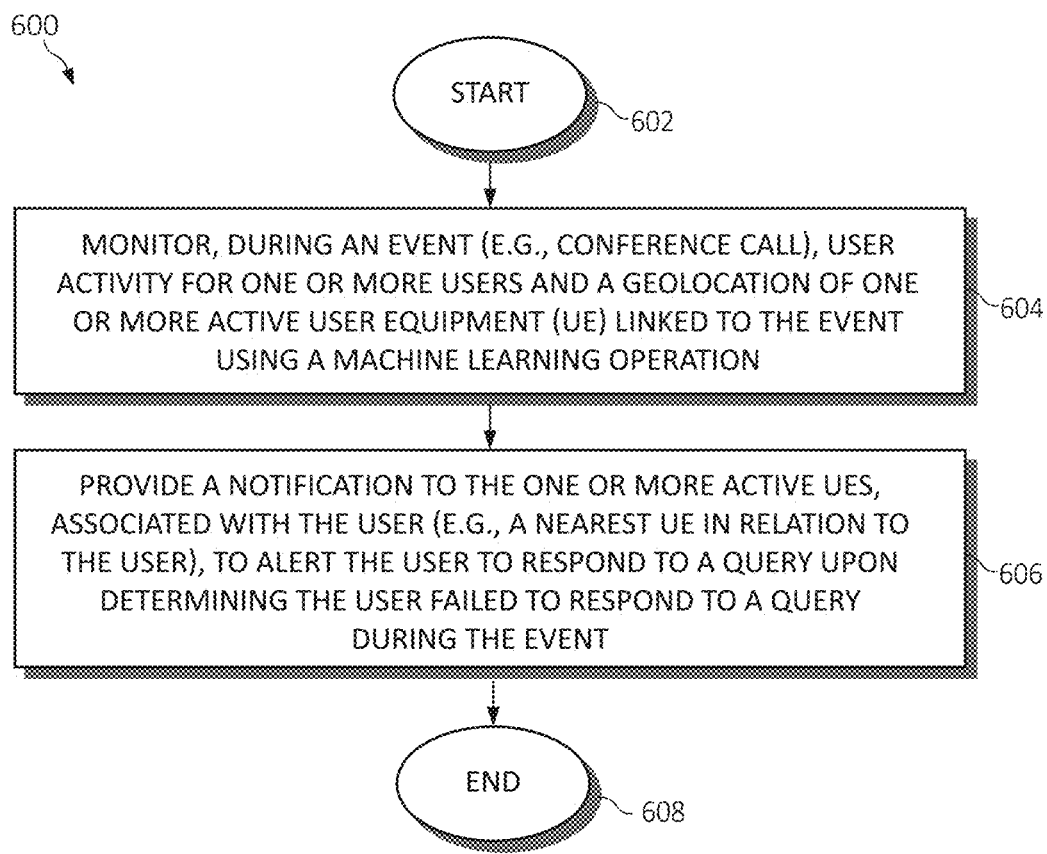
FIG. 6 is an additional flowchart diagram depicting an additional exemplary method for intelligent user notification during an event in an Internet of Things (IoT) computing environment by a processor, again in which aspects of the present invention may be realized.

Turning now to FIG. 6, a method 600 for intelligent notification during an event in an Internet of Things (IoT) computing environment is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

User activity for one or more users and a geolocation of one or more active user equipment (UE) (and associated with the one or more users) linked to the event may be monitored during an event (e.g., conference call), using a machine learning operation, as in block 604. A notification may be provided (e.g., sent, communicated, delivered, etc.) to the one or more active UEs, associated with the user (e.g., a nearest UE in relation to the user), to alert the user to respond to a query upon determining the user failed to respond to the query during the event, as in block 606. The functionality 600 may end in block 608.

In one aspect, in conjunction with and/or as part of at least one block of FIG. 6, the operations of method 600 may include each of the following. The operations of method 600 may detect a physical presence, a physical absence, a virtual presence, a virtual absence, or a combination thereof for one or more users for the event, wherein the event is a conference call including the plurality of users at one or more physical or virtual locations. The operations of method 600 may monitor, during the event, user activity for one or more users using a machine learning operation, and/or monitor, during the event, a geolocation of the one or more active UEs linked to the event using a machine learning operation. Also, notifying the one or more UEs further includes prioritizing the one or more UEs for receiving, and/or providing a notification having the query and a timestamp of the query to a nearest one of the UEs in relation to the user.

The operations of method 600 may extract one or more features for identifying a user providing a communication during the event, process one or more communications of the event using natural language processing (NLP), convert an image or video data of the one or more communications to text data, and/or convert audio data of the one or more communications to text data. The notification may be terminated upon learning the user or an alternative user responded to the query.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for intelligent notification during an event in an Internet of Things (IoT) computing environment, comprising:
   determining a user is participating in an ongoing event;
   determining the user failed to respond to a query during the ongoing event, wherein the query is specifically directed toward the user, and wherein determining the user failed to respond includes commencing a timer upon detecting that the user is issued the query in the ongoing event, and detecting that the user failed to respond to the query prior to a predetermined amount of time having elapsed subsequent to the commencement of the timer;
   determining, during the ongoing event, a geolocation of the user and one or more user equipment (UE) associated with the user;
   responsive to the predetermined amount of time having elapsed during which the user failed to respond to the query, providing a notification to one or more UEs associated with the user to alert the user to respond to the query, wherein the notification, inclusive of the query and a timestamp of the query, is transmitted to a nearest one of the UEs in physical relation to the user notwithstanding whether the nearest one of the UEs is actively engaged in the ongoing event; and
   terminating the notification upon learning the user or an alternative user responded to the query.

2. The method of claim 1, further including detecting a physical presence, a physical absence, a virtual presence, a virtual absence, or a combination thereof for one or more users for the event, wherein the event is a conference call including the plurality of users at one or more physical or virtual locations.

3. The method of claim 1, further including monitoring, during the event, user activity for one or more users using a machine learning operation.

4. The method of claim 1, further including monitoring, during the event, a geolocation of the one or more active UEs linked to the event using a machine learning operation.

5. The method of claim 1, wherein the notifying the one or more UEs further includes prioritizing the one or more UEs for receiving the notification.

6. The method of claim 1, further including:
   extracting one or more features for identifying a user providing a communication during the event;
   processing one or more communications of the event using natural language processing (NLP);
   converting an image or video data of the one or more communications to text data; or
   converting audio data of the one or more communications to text data.

7. The method of claim 1, further including initializing a machine learning operation to learn whether the user or the alternative user responded to the query.

8. A system for intelligent notification during an event in an Internet of Things (IoT) computing environment, comprising:
   one or more computers with executable instructions that when executed cause the system to:
      determine a user is participating in an ongoing event;
      determine the user failed to respond to a query during the ongoing event, wherein the query is specifically directed toward the user, and wherein determining the user failed to respond includes commencing a timer upon detecting that the user is issued the query in the ongoing event, and detecting that the user failed to respond to the query prior to a predetermined amount of time having elapsed subsequent to the commencement of the timer;
      determine, during the ongoing event, a geolocation of the user and one or more user equipment (UE) associated with the user;

responsive to the predetermined amount of time having elapsed during which the user failed to respond to the query, provide a notification to one or more UEs associated with the user to alert the user to respond to the query, wherein the notification, inclusive of the query and a timestamp of the query, is transmitted to a nearest one of the UEs in physical relation to the user notwithstanding whether the nearest one of the UEs is actively engaged in the ongoing event; and terminate the notification upon learning the user or an alternative user responded to the query.

9. The system of claim 8, wherein the executable instructions further detect a physical presence, a physical absence, a virtual presence, a virtual absence, or a combination thereof for one or more users for the event, wherein the event is a conference call including the plurality of users at one or more physical or virtual locations.

10. The system of claim 8, wherein the executable instructions further monitor, during the event, user activity for one or more users using a machine learning operation.

11. The system of claim 8, wherein the executable instructions further monitor, during the event, a geolocation of the one or more active UEs linked to the event using a machine learning operation.

12. The system of claim 8, wherein the notifying the one or more UEs further includes prioritizing the one or more UEs for receiving the notification.

13. The system of claim 8, wherein the executable instructions further:
  extract one or more features for identifying a user providing a communication during the event;
  process one or more communications of the event using natural language processing (NLP);
  convert an image or video data of the one or more communications to text data; or
  convert audio data of the one or more communications to text data.

14. The system of claim 8, wherein the executable instructions further initialize a machine learning operation to learn whether the user or the alternative user responded to the query.

15. A computer program product for intelligent notification during an event by a processor, the computer program product comprising a non-transitory computer- readable storage medium having computer-readable program code portions stored therein, the computer-readable program code portions comprising:
  an executable portion that determines a user is participating in an ongoing event:
  an executable portion that determines the user failed to respond to a query during the ongoing event, wherein the query is specifically directed toward the user, and wherein determining the user failed to respond includes commencing a timer upon detecting that the user is issued the query in the ongoing event, and detecting that the user failed to respond to the query prior to a predetermined amount of time having elapsed subsequent to the commencement of the timer;
  an executable portion that determines, during the ongoing event, a geolocation of the user and one or more user equipment (UE) associated with the user:
  an executable portion that, responsive to the predetermined amount of time having elapsed during which the user failed to respond to the query, provides a notification to one or more UEs associated with the user to alert the user to respond to the query, wherein the notification, inclusive of the query and a timestamp of the query, is transmitted to a nearest one of the UEs in physical relation to the user notwithstanding whether the nearest one of the UEs is actively engaged in the ongoing event; and
  an executable portion that terminates the notification upon learning the user or an alternative user responded to the query.

16. The computer program product of claim 15, further including an executable portion that detects a physical presence, a physical absence, a virtual presence, a virtual absence, or a combination thereof for one or more users for the event, wherein the event is a conference call including the plurality of users at one or more physical or virtual locations.

17. The computer program product of claim 15, further including an executable portion that: monitors, during the event, user activity for one or more users using a machine learning operation; and monitors, during the event, a geolocation of the one or more active UEs linked to the event using a machine learning operation.

18. The computer program product of claim 15, further including an executable portion that prioritizes the one or more UEs for receiving the notification.

19. The computer program product of claim 15, further including an executable portion that: extracts one or more features for identifying a user providing a communication during the event; processes one or more communications of the event using natural language processing (NLP); converts an image or video data of the one or more communications to text data; or converts audio data of the one or more communications to text data.

20. The computer program product of claim 15, further including an executable portion that initializes a machine learning operation to learn whether the user or the alternative user responded to the query.

* * * * *